United States Patent
Konen

(10) Patent No.: US 7,171,712 B2
(45) Date of Patent: Feb. 6, 2007

(54) WIRE STRIPPER WITH STRIP LENGTH SCALE

(75) Inventor: Bruce P. Konen, Aurora, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 10/885,825

(22) Filed: Jul. 7, 2004

(65) Prior Publication Data

US 2006/0005315 A1   Jan. 12, 2006

(51) Int. Cl.
*B25F 1/10*   (2006.01)
(52) U.S. Cl. .................... 7/107; 7/163; 7/108
(58) Field of Classification Search ............ 7/107, 7/150, 152, 156, 163–164
See application file for complete search history.

(56) References Cited

U.S. PATENT DOCUMENTS

| 102,436 | A | * | 4/1870 | Russell | 7/163 |
| 2,668,464 | A | * | 2/1954 | Paules | 30/91.2 |
| 3,151,510 | A | * | 10/1964 | Bunker et al. | 30/90.6 |
| 3,341,870 | A | * | 9/1967 | Nystrom | 7/163 |
| 4,451,948 | A | | 6/1984 | Goodrich et al. | |
| 5,345,636 | A | * | 9/1994 | Lamons | 7/139 |

* cited by examiner

*Primary Examiner*—Lee D. Wilson
(74) *Attorney, Agent, or Firm*—Cook, Alex, McFarron, Manzo, Cummings & Mehler, Ltd.

(57) ABSTRACT

A strip length scale for a wire stripper has a receiving portion, a channel aligned with the receiving portion and gradation markings along the length of the channel. Numerical markings next to the gradation marking correspond with the length of the channel. The channel receives the bare conductor portion of a stripped insulated wire. The receiving portion of the strip length scale receives the insulated wire portion of the stripped insulated wire. An abutment at the junction of the channel and receiving portion locates the end of the insulation accurately.

9 Claims, 3 Drawing Sheets

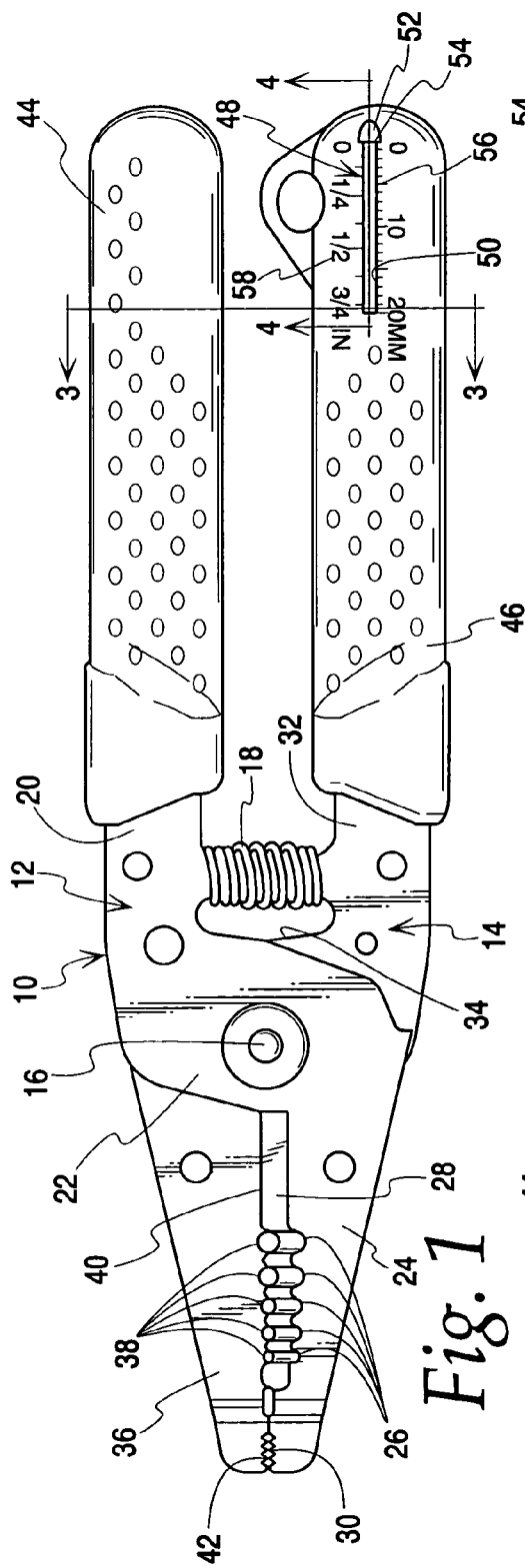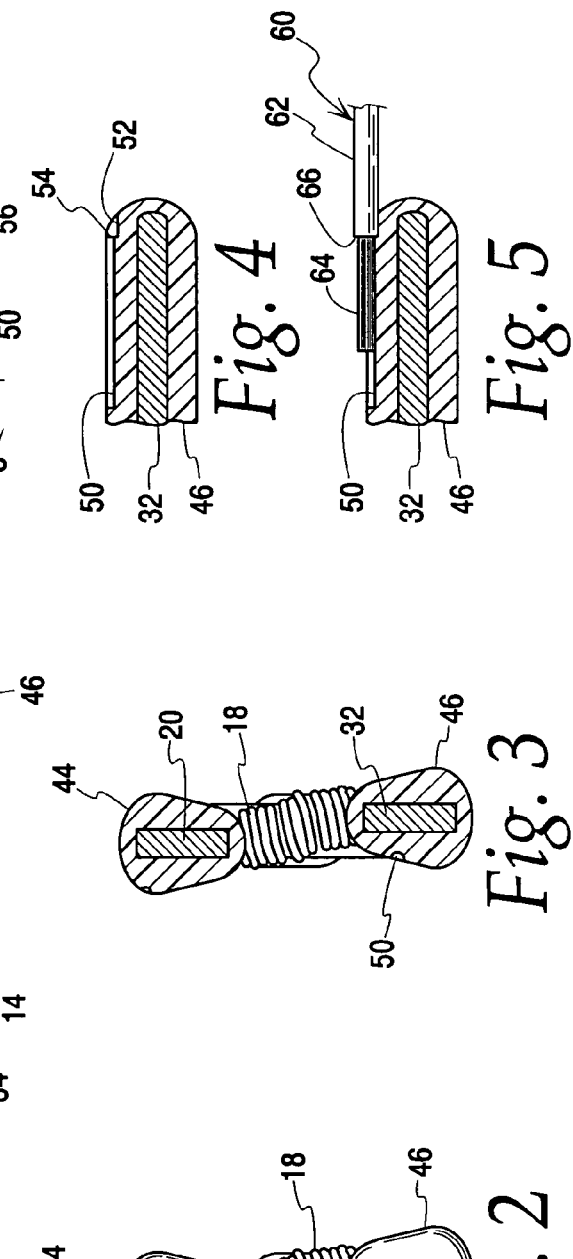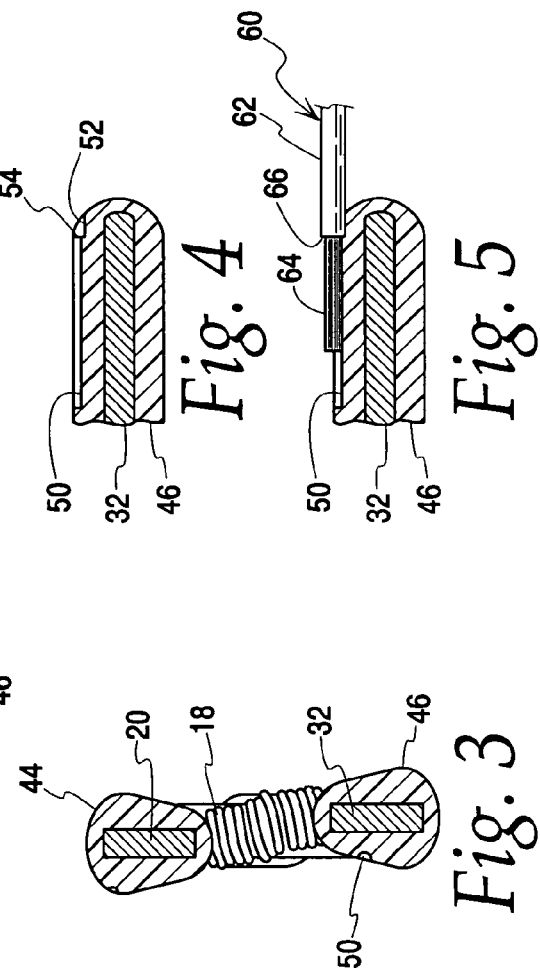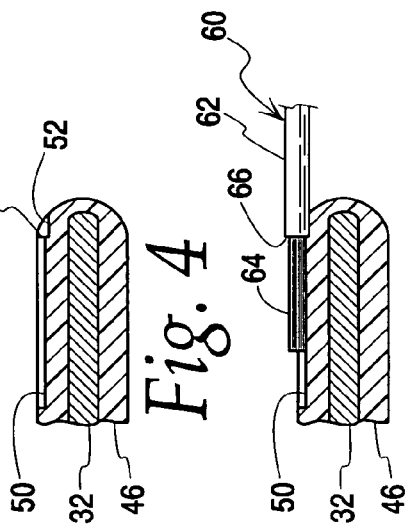

WIRE STRIPPER WITH STRIP LENGTH SCALE

BACKGROUND OF THE INVENTION

The present invention generally relates to wire strippers and, more specifically, to a strip length scale for a wire stripper.

Wire strippers are typically used to strip the insulation from electrical wire. Conventional wire strippers have been adapted to perform other related functions such as cutting, gripping, twisting, untwisting, or looping wire. During wire stripping, it is also desirable to measure easily and accurately the proper amount of insulation stripped or to be stripped from the electrical wire. It would yet be further desirable to incorporate a scale in or on the structure of the wire stripper to eliminate a second tool or instrument for such measurement.

Accordingly, it is an object of this invention to provide a strip length scale which is incorporated into the structure of the wire stripper for measuring the amount of insulation stripped or to be stripped from the electrical wire.

These and other desired objects of the invention will become apparent from the following description. It will be understood, however, that a structure could still appropriate the claimed invention without accomplishing each and every one of these desired benefits, including those gleaned from the following description. The appended claims, not these desired benefits, define the subject matter of the invention.

SUMMARY OF THE INVENTION

In view of the desired goals of the invention claimed herein, a strip length scale for a wire stripper is formed in the handle of the tool. The scale has a depressed receiving portion, an elongated channel adjoining the receiving portion, and a set of graduated markings along the length of the channel. The depth of the receiving portion is somewhat greater than that of the channel such that an abutment is formed at the junction of the receiving portion and channel. The channel of the strip length scale is adapted to receive the wire's conductor, i.e., the bare portion of a stripped insulated wire. The receiving portion of the strip length scale is adapted to receive the end portion of the insulation of the wire. In order to accurately measure and securely receive the wire, the depth of the receiving portion and channel are sufficient to accept the most common wire sizes.

Accordingly, after the insulated wire is stripped, the exposed conductor at the end of the wire is placed within the channel and the end portion of the insulation is placed within the receiving portion. The end of the insulation is pressed against the abutment such that all of the stripped conductor lies in the channel and the length of wire that has been stripped from the wire may be accurately measured by comparison with the graduated markings adjacent to the channel.

BRIEF DESCRIPTION OF THE DRAWINGS

FIG. 1 is a front view of the strip length scale incorporated onto the handle of a hand-held wire stripper.

FIG. 2 is an end view of the wire stripper with the strip length scale of the present invention on its handle.

FIG. 3 is a section taken along line 3—3 of FIG. 1.

FIG. 4 is a fragmentary section taken along line 4—4 of FIG. 1.

FIG. 5 is a section similar to FIG. 4, shown with a stripped wire in place in the scale.

DETAILED DESCRIPTION OF THE INVENTION

Figure 6:
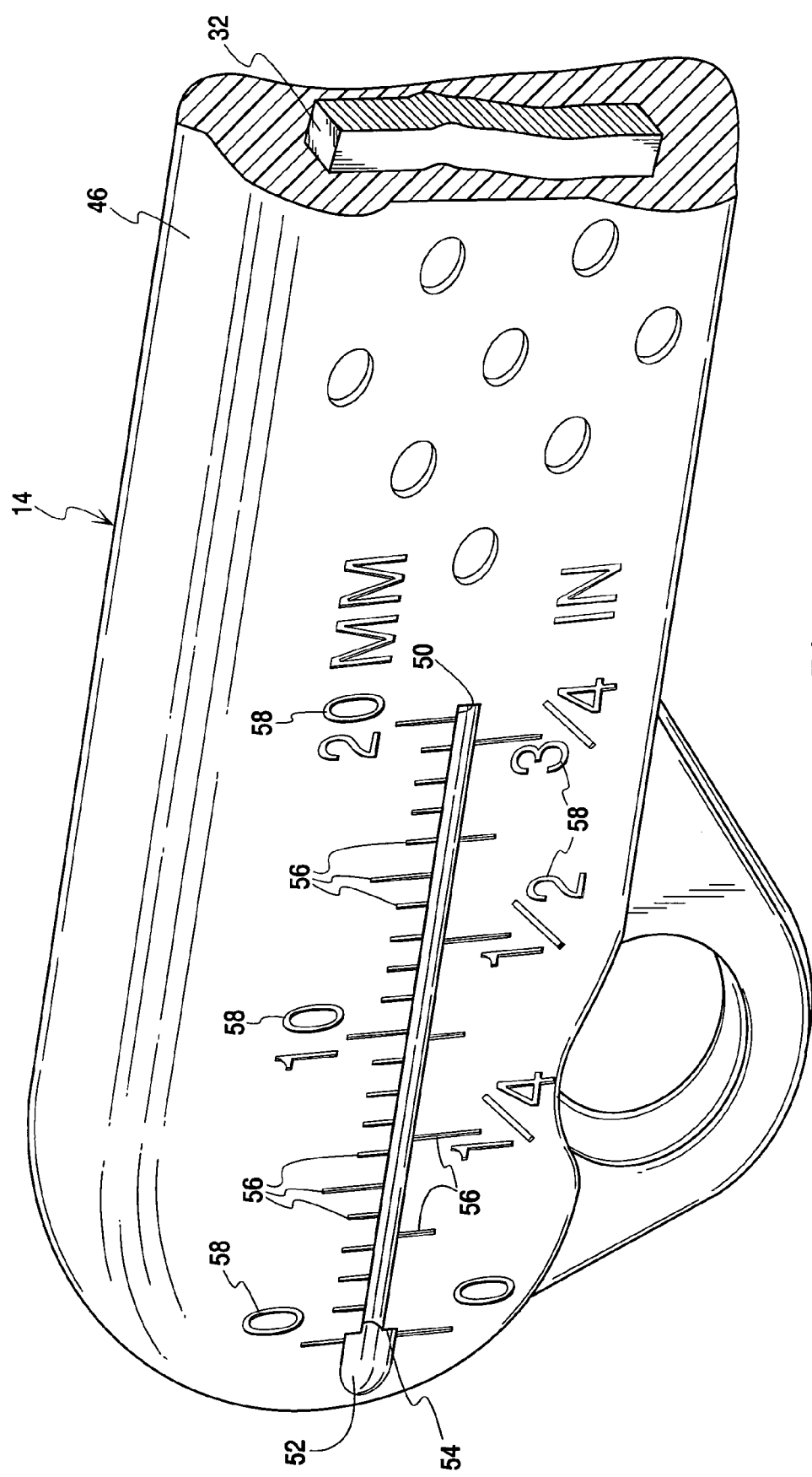
FIG. 6 is a perspective view of a portion of the wire stripper handle, on a greatly enlarged scale.
Figure 7:
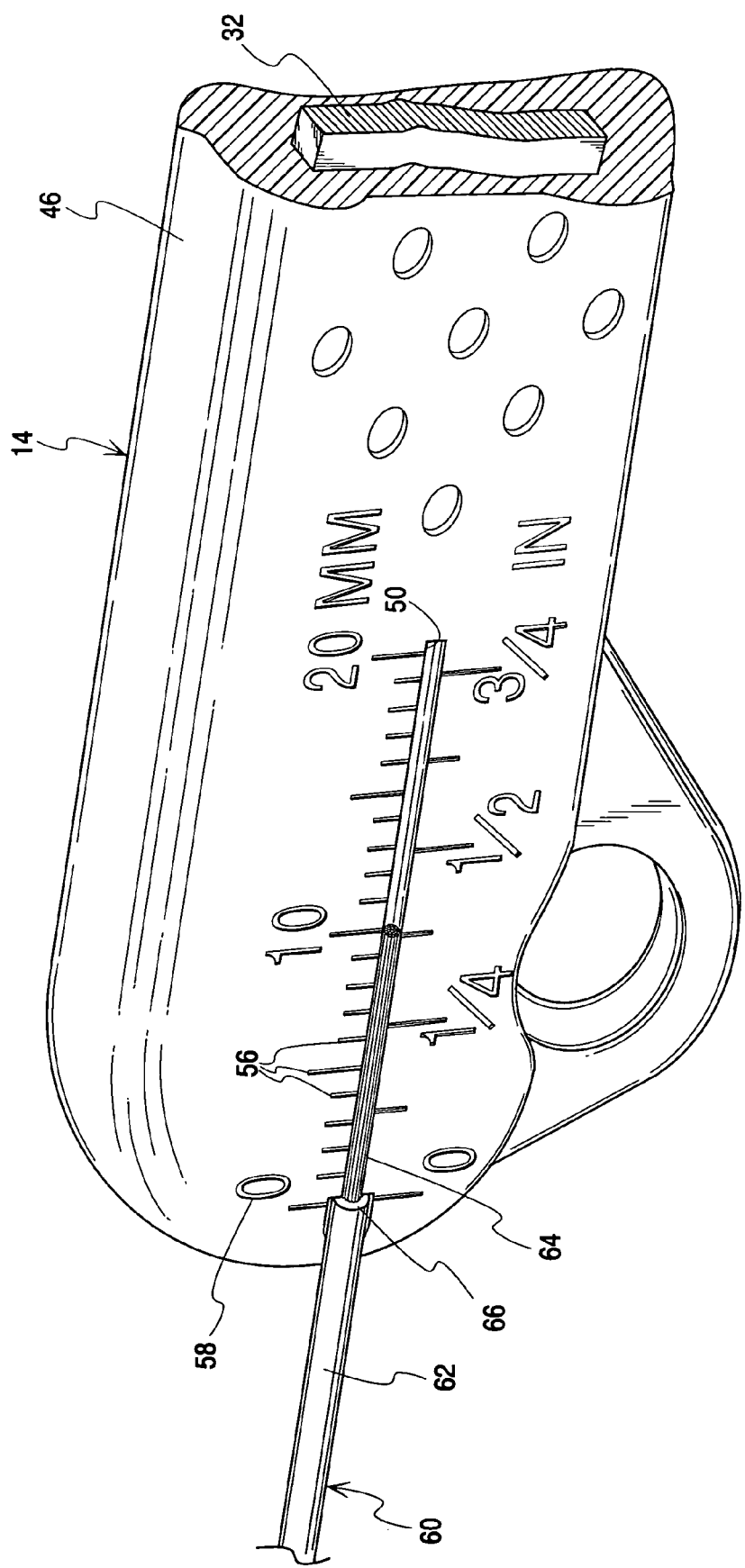
FIG. 7 is a view similar to FIG. 6, shown with a stripped wire in place in the scale.

FIG. 1 shows a hand tool 10 which may be used for cutting, gripping, twisting, and stripping wire. The hand tool 10 includes first and second elongated members 12 and 14. The elongated members may be formed as integral stampings which include a handle, a transition portion and a jaw. The elongated members 12, 14 are pivotally connected together at a pivot pin 16. The pivot pin allows the elongated members 12, 14 to pivot relative to one another. A spring biases 18 the handles apart.

The first elongated member 12 has a handle 20, a transition portion 22 and a jaw 24. The inside edge of the jaw has a series of variably-sized wire stripping grooves or notches 26 formed thereon. A cutting edge 28 extends from the notches to the transition portion 22. A nose 30 at the outer end of the jaw forms a gripping member.

The second elongated member 14 is similar to the first member 12 in that it includes a handle 32, a transition portion 34 and a jaw 36. The jaw has variably-sized wire stripping notches 38. Both sets of notches 26 and 38 are generally semi-circular openings. The notches cooperate with their equal-sized counterparts on the other jaw to form insulation cutting openings sized for a particular gauge wire, as is conventional. A cutting edge 40 and nose 42 complete the jaw structure. The cutting edges 28 and 40 are in adjacent planes so they perform a slicing or shearing action. The noses 30 and 42 are bent out of the planes of their respective elongated members so they will confront one another when the tool is closed so they can provide a gripping function.

The hand tool 10 further comprises first and second handle sleeves 44 and 46. As shown in FIGS. 2 and 3, the sleeves 44, 46 conform about their respective handles 20 and 32. These sleeves 44, 46 may be constructed out of rubber, plastic, or any other suitably soft but durable material to provide a cushion for the handles 20, 32. The ends of the sleeves have a rounded configuration. The wire stripper as described thus far is conventional, as exemplified by the wire stripper sold by IDEAL Industries, Inc. under their trademark T® Stripper.

One of the handle sleeves, in this case the second sleeve 46 has formed thereon a strip length scale 48 according to the present invention. As shown in FIGS. 2 and 3, the strip length scale 48 preferably is molded into the sleeve 46. The strip length scale 48 includes a channel 50 situated along the length of the sleeve. The channel is a groove or depression in the surface of the sleeve. The channel 50 terminates at a receiving portion 52 as shown in FIGS. 4–7. The receiving portion is also a depression in the surface of the sleeve, but it has a greater depth and width than the channel 50. Accordingly, there is an abutment 54 (FIG. 4) formed at the intersection of the channel and receiving portion. Because the receiving portion opens outwardly to the end of the rounded sleeve, the end of the receiving portion opposite the abutment has an elliptical configuration, as seen in FIGS. 1 and 6. Together the channel 50 and receiving portion 52 form a firm foundation for positioning a wire.

A series of gradation marks 56 and numerical markings 58 are laid out adjacent the channel 50. These are in the usual form of a ruler or measuring tape or the like to indicate length. They show the distance from the abutment 54. In the preferred embodiment one set of gradations is laid out in inches and a second set indicates length in millimeters. Other units of measurement could be substituted if desired.

The use, operation and function of the strip length scale are as follows. A stripped insulated wire 60 comprises insulation 62 and a bare conductor 64 extending beyond the end of the insulation. The insulation terminates at an end face 66 (FIGS. 5 and 6). A user places the wire 60 into the scale 48 with the insulation 62 in the receiving portion 52 and the conductor 64 in the channel 50. The end face 66 of the insulation is engaged with the abutment 54. With the wire so situated, the length of the exposed conductor can be read off of the scale provided by the gradation marks 56.

In order to accurately measure and securely receive the wire, the channel 50 has a width and a depth which are large enough to receive enough of the conductor to secure it in the channel, at least momentarily so a length measurement can be read. Similarly, the receiving portion 52 has sufficient width and depth to enclose enough of the insulation to provide a firm placement of the wire against the gradation marks. The abutment assures that the end face of the insulation is placed at the beginning of the gradation marks.

The scale can also be used with unstripped wire to determine where a strip should be taken to expose the desired length of conductor. In this case the end of the unstripped wire is laid in the channel and the end of the wire is aligned with the marking showing the desired strip length. Then a mark of some type is placed on the insulation at the location of the abutment 54. The wire is then placed in a stripping device and stripped at the location of the mark. If desired the strip length could then be confirmed by placing the now stripped wire back in the scale to check the actual length of the bare conductor.

The channel 50 and receiving portion 52 are shown as having a generally semi-circular cross section for accommodating the usual circular wire. However, the channel and receiving portion may have other cross sectional shapes that accommodate other wire configurations, including rectangular or oval. At the same time it should be noted that a circular cross section of appropriate dimension can still be used effectively with non-circular wire shapes. The cross sectional dimensions of the channel and receiving portion may be chosen so as to accommodate the greatest number of wire sizes that are anticipated for use with the particular tool. It is preferred, however, that the receiving portion have a greater depth than the channel so an abutment will be formed at their junction which will make it easy to locate properly the stripped portion relative to the scale.

Furthermore, it is contemplated that the strip length scale may be incorporated on any type of wire stripper. For example, it may be incorporated into laser wire strippers, thermal wire strippers, power operated wire strippers, rotary wire strippers, and hand held wire strippers.

While the strip length scale is shown molded into the sleeve of one of the handles, scale may be placed or located on any portion of the wire stripper. For example, the strip length scale may be formed in one of the jaws or transition portions. Alternatively, if the wire stripper does not have sleeves mounted on the handles, then the strip length scale may be formed in the body of the handles.

It should be noted that while the term wire stripper is used herein to describe the hand tool 10 of the preferred embodiment, it will be understood that the disclosed strip length scale 12 could be incorporated into other types of electrician's tools, such as linesman's pliers. It will also be understood that this description shall not be construed in a limiting sense. Rather, various changes and modifications can be made to the illustrative embodiments without departing from the true spirit and scope of the invention, as defined by the following claims.

I claim:

1. A hand tool for stripping insulation from an insulated wire and measuring the length of insulation stripped or to be stripped from a bare conductor at the end of the wire, comprising: first and second elongated members pivotally connected at a pivot pin, the first and second elongated members respectively comprising first and second handles on one side of the pivot pin and first and second jaws on the other side of the pivot pin; one of said elongated members having a strip length scale comprising a receiving portion having a depth sufficient to receive at least a portion of the insulation, a channel joining the receiving portion at a starting point, the channel having a depth sufficient to receive at least a portion of the bare conductor; and a plurality of gradation marks spaced along the channel indicating the distance from the starting point.

2. The hand tool of claim 1 wherein the depth of the channel is less than the depth of the receiving portion so that an abutment is formed at the junction of the channel and receiving portion, the abutment defining the starting point.

3. The hand tool of claim 1 wherein the strip length scale is situated on one of said handles.

4. The hand tool of claim 1 wherein said strip length scale further comprises a plurality of numerical markings associated with the gradation marks and which correspond with units of measurement.

5. The hand tool of claim 1 wherein the receiving portion has a generally semi-circular circular cross section.

6. The hand tool of claim 1 wherein the channel has a generally semi-circular circular handles.

7. The hand tool of claim 1 wherein said handles further comprise sleeves about said handles.

8. The hand tool of claim 7 wherein the strip length scale is situated on one of said sleeves.

9. The hand tool of claim 7 wherein strip length scale is molded into one of said sleeves.

* * * * *